United States Patent [19]

Niestegge

[11] Patent Number: 4,833,669
[45] Date of Patent: May 23, 1989

[54] CIRCUITRY FOR CONNECTING MULTISTAGE COUPLING FIELDS AND INTERMEDIATE LINES

[75] Inventor: Gerd Niestegge, Munich, Fed. Rep. of Germany

[73] Assignee: Siemens Aktiengesellschaft, Berlin and Munich, Fed. Rep. of Germany

[21] Appl. No.: 149,349

[22] Filed: Jan. 28, 1988

[30] Foreign Application Priority Data

Feb. 20, 1987 [DE] Fed. Rep. of Germany ....... 3705503

[51] Int. Cl.$^4$ ............................................. H04Q 11/04
[52] U.S. Cl. ..................................... 370/58; 340/825.8
[58] Field of Search .................. 370/58, 59; 340/825.8

[56] References Cited

U.S. PATENT DOCUMENTS

| | | | |
|---|---|---|---|
| 3,674,938 | 7/1972 | Jacob | 340/825.8 |
| 4,467,471 | 8/1984 | Troost | 370/68 |
| 4,587,649 | 5/1986 | Maddern | 370/58 |
| 4,654,842 | 3/1987 | Coraluppi et al. | 370/58 |

FOREIGN PATENT DOCUMENTS 1474267 5/1977 United Kingdom .

*Primary Examiner*—Douglas W. Olms
*Assistant Examiner*—Melvin Marcelo
*Attorney, Agent, or Firm*—Adel A. Ahmed

[57] ABSTRACT

Coupling circuitry for multistage coupling fields in telecommunications networks, especially time-multiplex telephone switching systems, with switching matrices and intermediate lines that connect them from coupling stage to coupling stage.

The multistage coupling field has intermediate-line wiring wherein a number of intermediate lines extends in parallel in a group of intermediate lines from every switching matrix in the first coupling stage to every switching matrix in the second coupling stage, the number being large enough to prevent interior blockage even while multichannel connections are being established. The number of switching matrices in the second coupling stage is for this purpose one more than double the quotient, rounded off to a whole number, of the difference between the connecting lines connected to the input end of one switching matrix in the first coupling stage and the maximum number of connecting lines or intermediate lines to be seized per multichannel connection and the difference between the number of intermediate line per group of intermediate lines increased by one and the maximum number of connecting lines or intermediate lines to be seized per multichannel connection.

3 Claims, 1 Drawing Sheet

CIRCUITRY FOR CONNECTING MULTISTAGE COUPLING FIELDS AND INTERMEDIATE LINES

The present invention relates to circuitry for connecting multistage coupling fields in telecommunications systems, especially time-multiplex telephone switching systems with switching matrices and furthermore, to second, intermediate lines for connecting them from coupling stage to coupling stage.

A multistage coupling field with reverse grouping is known from German Pat. No. 2 333 297 (VPA 73 P 6106). That patent is essentially concerned with the principle of an optimal path-seeking method. The special path-seeking method disclosed therein extensively eliminates the effects of underirable interior blocking. Very generally, the dimensioning of a multistate coupling field involves among other matters how to practically dimension the numbers of switching matrices per coupling stage from the second to the last coupling stage and the number of input terminals and output terminals per switching matrix. Another significant question in this context is how to practically determine the number of intermediate lines, each of which extends from the switching matrices in one coupling stage to the switching matrices in the next coupling stage. What is of essential importance is that no interior blocking occurs and that any faulty exploitation of coupling switchgear and intermediate lines of the type that might be caused by impractical overdimensioning is avoided.

Also known, from European Pat. No. 0 053 267 (VPA 80 P 6236), is the production, through a multistage coupling field, of multichannel connections, multiple connections in other words, that are switched through from a single switching matrix in one input stage through a single, usually another, switching matrix, which in that known case also performs the function of an output stage. Multiple connections of this type are employed to attain an accordingly higher transmission bandwidth.

The present invention concerns coupling circuitry for multistage coupling fields with reverse grouping in time-multiplex telecommunications networks, especially PCM telephone switching systems, with initial switching matrices in an initial coupling stage and other switching matrices in another coupling stage and with connecting lines connected to the input terminals of the switching matrices in the first coupling stage, each of which is in particular designed in the form of a pair of transmission channels for each of the two transmission directions, and with groups of intermediate lines in particular designed in the form of groups of pairs of channels, whereof the intermediate lines of each output terminal connect one of the first switching matrices with input terminals of one of the second switching matrices, whereby each of the first switching matrices communicates with each of the second switching matrices over a number of intermediate lines derived on the whole from the product of the numbers of the first and second switching matrices, and with simple connections that establish connections for both only a single connecting line or intermediate line and with multichannel connections that establish connections for each multiplicity of parallel connecting lines or intermediate lines per connection and accordingly attain a higher transmission bandwidth.

In coupling circuitry of this type, the fact that the time situation can vary within the pulse framework due to the through connections conventional with time-multiplex coupling circuitry even throughout space-time coupling stages in relation to the individual connections associated with a single multiple connection makes for the problem typical of such multiple connections that the pulse-telegram sequence per multiple connection can be disrupted.

An object of the present invention is accordingly to provide coupling circuitry of the aforesaid type wherein the original pulse-telegram sequence can be correctly maintained per multiple connection. The invention is also intended to ensure in this context the maintenance of blocking freedom within the coupling field not only when switching multiple connections through but likewise when switching simple connections through. Appropriate dimensioning of the coupling field, however, is intended not only to ensure blocking freedom but also that blocking freedom can be attained within the coupling field at the least possible technological expenditure.

The invention is accordingly characterized in the time multiple connections are switched through from just one of the first switching matrices through just one of the second switching matrices to just one of the first switching matrices and in that the number of second switching matrices is at least one more than twice the quotient, rounded off down to a whole number, of the difference between the number of connecting lines connected at the input and to each initial switching matrix and the maximum number of connecting lines or intermediate lines to be established per multichannel connection and of the difference between the number of intermediate lines per group of intermediate line increased by one and the maximum number of connecting lines or intermediate lines to be established per multichannel connection.

BRIEF DESCRIPTION OF THE DRAWING

The drawing, FIGS. 1 and 2, essentially illustrates just the components of two embodiments of the invention necessary for their comprehension.

DETAILED DESCRIPTION

The switching matrices exist in two coupling stages R and S. The switching matrices operate in accordance with the known principles of time multiplexing and especially with the also known PCM principle. The switching matrices in both coupling stages are in the form of combination space-situation and time-situation switching matrices.

Connected to the switching matrices R1 to Ro in initial coupling stage R are input-and time-multiplex lines x11 to xca. Each time-multiplex line comprises in a way known per se 32 pairs of channels, whereby each channel pair is appropriate for switching through one connection in a simple connection.

The switching matrices in coupling stages R on the one hand and coupling stages S on the other are connected as illustrated. One of these time-multiplex intermediate lines is labeled "y." Each time-multiplex intermediate line itself comprises a number, 32 for example, of channel pairs.

Figure 1:
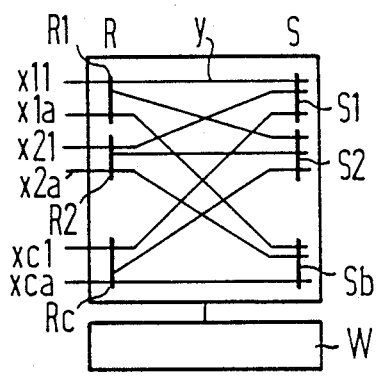
FIG. 1 represents a two-stage coupling field that features reverse grouping and FIG. 2 a three-stage coupling field that features reverse grouping.

Among the other structures illustrated in FIG. 1 is a path-finding device W that functions in a way that is known per se, locating a path for the purpose of determining a free connection path that can be switched throughover the coupling field. Path-finding devices are in themselves known, from Peter R. Gerke, Rechnergesteuerte Vermittlungssysteme (Springer, 1972) for example, wherein the relevant material will be found in the index under "Wegsuche." The path-finding device W illustrated in FIG. 1 herein can be designed and operated for example among the known lines described in that book.

FIG. 1 accordingly illustrates coupling circuitry for a two-stage coupling field that features reverse grouping in a time-multiplex telecommunications system, which can be a PCM switching system. The initial switching matrices are in an initial coupling stage R and the second switching matrices in another coupling stage S. Connecting lines are connected to the input terminals of the switching matrices in first coupling stage R. They consist of the channel pairs in time-multiplex lines x11 to xca. Each pair of transmission channels has in a known way one channel for each transmission direction.

As already specified herein, intermediate lines extend between the switching matrices in the first coupling stage and the switching matrices in the second coupling stage. These intermediate lines are also in the form of channel pairs. Each time-multiplex intermediate line that extends from a switching matrix in the first coupling stage to a switching matrix in the second coupling stage can, as already specified herein, comprises 32 intermediate lines. Thus, one time-multiplex intermediate line extends from each switching matrix in the first coupling stage to one switching matrix in the second coupling stage. The number of time-multiplex intermediate lines extending from the switching matrices in the first coupling stage to the switching matrices in the second coupling stage equals the product of the numbers of switching matrices in the first coupling stage and the number of switching matrices in the second coupling stage. Since each time-multiplex intermediate line comprises 32 channel pairs, it simultaneously represents a group of intermediate lines. The accordingly created intermediate lines in each group of intermediate lines connect output terminals in each of the first switching matrices with input terminals in each of the second switching matrices. Thus, each initial switching matrix connects with each second switching matrix through a number of groups of intermediate lines that is derived on the whole from the product of the numbers of first and second switching matrices.

Both simple and multiple connections are established. Each simple connection comprises only one connecting line or intermediate line. Multiple connections always comprise a number of parallel connecting lines or intermediate lines per connection, and are intended for attaining a correspondingly higher transmission bandwidth in a way that is in itself known.

The path seeking procedure carried out by path-finding device W ensures that multiple connections will always be switched through from a single initial switching matrix to a single initial switching matrix through a single second switching matrix. This ensures that, when time-multiplex connections are switched through over time-multiple switching matrices or combination space-and-time multiple switching matrices, the original sequence of pulse telegrams associated with each multiple connection will remain constant. This procedure for establishing multiple connections, which is also called parallel through-switching, requires, however, that a sufficient number of intermediate lines always remain free within the particular groups of intermediate lines. If, for example, a multiple connection is established over switching matrices R1, Sb, and Rc, it must be ensured that an adequate number of free intermediate lines are available not only in the group of intermediate lines that extends from switching matrix R1 to switching matrix Sb but also in the group of intermediate lines that extends from switching matrix Sb to switching matrix Rc. Thus, enough intermediate lines must be simultaneously available in both of the groups of intermediate lines in question. If, accordingly, thre are not enough intermediate lines available for use in a multiple connection in even one of the two groups of intermediate lines, that multiple connection cannot be switched through over that switching matrix, Sb for instance.

The coupling-field structure in accordance with the invention accordingly ensures that, when the input-end multiple-connection connecting lines are occupied, a multiple connection can still be established through the coupling field illustrated in FIG. 1 if the number of connecting lines that would be occupied outgoing in this context in relation to the particular multiple connection is still available. The invention accordingly concerns mainly the number of second switching matrices, the switching matrices in coupling stage S, that is. The number of intermediate lines per group of intermediate lines on the other hand is dictated by the number of channel pairs per time-multiplex intermediate line. This value is accordingly derived from the particular time-multiplex system employed with the time-multiplex intermediate lines.

As already specified herein, connecting lines are connected to the input end of the coupling field. Each connecting line can accordingly consist of one channel pair. FIG. 1 shows time-multiplex lines x1 to xca at the input end of the coupling field. Each time-multiplex line comprises a number of channel pairs. Each channel pair represents a connecting line in the sense of the invention. The number of connecting lines at the input end of each switching matrix in initial coupling stage R accordingly equals the product of the time-multplex lines per switching matrix and the channel pair per time-multiplex line.

The number of second switching matrices is accordingly at least one more than twice the quotient, which is rounded off down to a whole number, of the difference between the number of connecting lines connected to the input end of each initial switching matrix and the maximum number of connecting lines or intermediate lines to be seized per multichannel connection and the difference between the number, increased by one, of intermediate lines per group of intermediate lines and the maximum number of connecting lines or intermediate lines to be seized per multichannel connection. This measure in accordance with the invention ensures that multichannel through connections through the coupling field illustrated in FIG. 1 will always be unblocked. Dimensioning the coupling field in this way not only ensures the aforesaid freedom from blockage but also keeps the expenditure on intermediate lines and coupling switchgear in the coupling field no higher than is necessary to ensure freedom from blockage.

The invention can also be employed when a system like that illustrated in FIG. 1 has an even number of first switching matrices and is uniformly divided into input switching matrices and output switching matrices. The connecting lines connected to the input switching matrices are in that case intended for incoming signals in relation to the direction that the connection has been established in and the connecting lines connected to the output switching matrices are intended for outgoing signals in relation to the direction that the connection has been established in. In this situation the coupling field illustrated in FIG. 1 will be completely altered in that the coupling field designed and illustrated in relation to reverse grouping can be reconstituted in the form of a coupling field with extended grouping and can accordingly be considered a coupling field with extended grouping.

Figure 2:
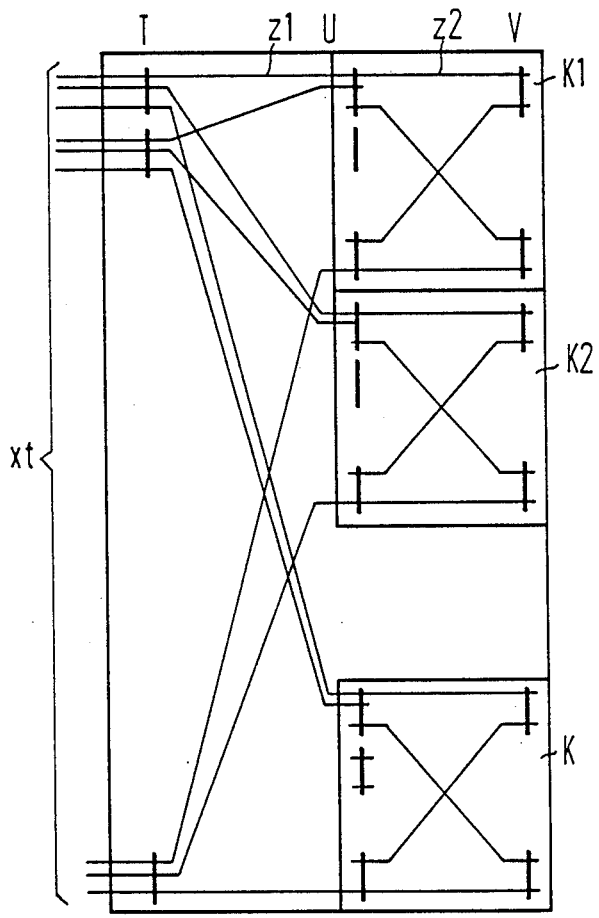

FIG. 2 illustrates a multiplicity of coupling circuits $K1, K2, \ldots, K$. This multiplicity of coupling circuits is combined into a single larger common coupling field. Also associated with this coupling field is a series of switching matrices in an additional coupling stage T. Coupling stages U and V accordingly correspond to the coupling stages R and S in FIG. 1. There accordingly exists a multiplicity of coupling circuits like those in FIG. 1. Upstream of them and in additional couping stage T is a number of additional switching matrices that equals the number of input terminals per coupling circuit. The connecting lines are connected to the input terminals of the switching matrices in additional coupling stage T. Each switching matrix in additional coupling stage T is connected through a group of additional intermediate lines to one of the several coupling circuits and specifically, inside each, to a switching matrix in the first coupling stage. The number of intermediate lines per group of intermediate lines and the number of additional intermediate lines per group of additional intermediate lines are equal. One of the groups of intermediate lines in FIG. 2 for example is labeled "z2." One of the groups of additional intermediate lines in FIG. 2 for example is labeled "z1." FIG. 2 accordingly illustrates a multiplicity of coupling circuits with an upstream number of additional switching matrices that equals the number of input terminals per coupling circuit. The connecting lines in this case are connected to their input terminals instead of to the input terminals of the initial switching matrices. Each switching matrix in additional coupling stage T is connected through one group of additional intermediate lines (e.g. z1) to one of the several coupling circuits and specifically within each to one switching matrix in first coupling stage U. The aforesaid multiplcity of coupling circuits is equal to the number of second switching matrices inside one coupling circuit.

The embodiment of the invention illustrated in FIG. 2 also includes a path-finding device that locates free connection paths and indicates their existence to a through-switching component. Path-finding devices of this type are, as previously mentioned herein, known from the literature.

What is claimed is:

1. A coupling arrangement for multistage coupling fields with reverse grouping in time-multiplex telecommunications networks, especially PCM telephone switching systems, with initial switching matrices in an initial coupling stage and other switching matrices in another coupling stage and with connecting lines connected to the input terminals of the switching matrices in the first coupling stage, each of which is in particular designed in the form of a pair of transmission channels for each of the two transmission directions, and with groups of intermediate lines in particular designed in the form of groups of pairs of channels, whereof intermediate lines of each output terminals connect one of the first switching matrices with input terminals of one of the second switching matrices, such that each of the first switching matrices communicates with each of the second switching matrices over a number of groups of intermediate lines derived on the whole from the product of the numbers of the first and second switching matrices, and with establishment of both simple connections comprising at least one of a single connecting line and (b) an intermediate line and multichannel connections comprising a plurality of at least one of (a) parallel connecting lines and (b) intermediate lines per connection and accordingly attaining a higher transmission bandwidth, characterized in that the multiple connections are switched through from just one of the first switching matrices through just one of the second switching matrices to just one of the first switching matrices and in that the number of second switching matrices is at least one more than twice the quotient, rounded off down to a whole number, of the difference between the number of connecting lines connected at the input and to each initial switching matrix and the maximum number of connecting lines or intermediate lines to be established per multichannel connection and of the difference between the number of intermediate lines per group of said groups of intermediate lines increased by one and the maximum number of connecting lines or intermediate lines to be established per multichannel connection.

2. A coupling arrangement as in claim 1, characterized by a plurality of coupling arrangements, having upstream thereof a number of additional switching matrices that equals the number of input terminals per coupling arrangement and further characterized in that the connecting lines are connected to their input terminals instead of to the input terminals of the initial switching matrices, in that each switching matrix in the additional coupling stage is connected through a group of additional intermediate lines to one of the several coupling arrangements and specifically inside each of a switching matrix in the first coupling stage, in that the number of intermediate lines per group of intermediate lines equals the number of additional intermediate lines per group of additional intermediate lines, and in that said plurality of coupling arrangements equals the number of second switching matrices inside one coupling circuit.

3. A coupling arrangement as in claim 1, characterized in that, when the number of initial switching matrices is even, they are uniformly divided into input switching matrices and output switching matrices and in that the connecting lines connected to the input switching matrices handle incoming signals in relation to the direction wherein the connection has been established and the connecting lines connected to the output switching matrices handle outgoing signals in relation to the direction wherein the connection has been established.

* * * * *